United States Patent [19]
Welte et al.

[11] Patent Number: 5,350,780
[45] Date of Patent: Sep. 27, 1994

[54] PROCESS FOR THE PREPARATION OF SUBSTANTIALLY CLOSED-CELL RIGID FOAMS CONTAINING URETHANE, UREA, BIURET, AND ISOCYANURATE GROUPS AND A METHOD OF USE THEREOF

[75] Inventors: Rainer Welte, Leverkusen; Hans J. Scholl, Cologne, both of Fed. Rep. of Germany

[73] Assignee: Bayer Aktiengesellschaft, Leverkusen, Fed. Rep. of Germany

[21] Appl. No.: 498,192

[22] Filed: Mar. 23, 1990

[30] Foreign Application Priority Data

Mar. 29, 1989 [DE] Fed. Rep. of Germany ....... 3910100

[51] Int. Cl.$^5$ .............................................. C08G 18/00
[52] U.S. Cl. .................... 521/173; 521/172; 521/129; 521/167; 528/48; 528/49; 528/52; 528/76; 528/84; 528/85; 528/84; 528/85
[58] Field of Search ............... 521/173, 172, 129, 167, 521/155; 528/76, 48, 49, 52, 84, 85

[56] References Cited

U.S. PATENT DOCUMENTS

| | | | |
|---|---|---|---|
| 4,115,373 | 9/1978 | Henes et al. | 528/48 |
| 4,255,569 | 3/1981 | Muller et al. | 544/193 |
| 4,273,882 | 6/1981 | Raynor | 521/110 |
| 4,342,842 | 8/1982 | Hira et al. | 521/167 |
| 4,435,537 | 3/1984 | Horn et al. | 524/391 |
| 4,481,309 | 11/1984 | Straehle et al. | 521/172 |
| 4,575,520 | 3/1986 | Kapps et al. | 521/107 |
| 4,680,214 | 7/1987 | Frisch et al. | 428/107 |
| 4,897,431 | 1/1990 | Scherzer et al. | 521/173 |

FOREIGN PATENT DOCUMENTS

| | | |
|---|---|---|
| 095530 | 12/1983 | European Pat. Off. . |
| 3642666 | 6/1988 | Fed. Rep. of Germany . |
| 1592534 | 7/1981 | United Kingdom . |
| 2099440 | 12/1982 | United Kingdom . |

*Primary Examiner*—John Kight, III
*Assistant Examiner*—Duc Truong
*Attorney, Agent, or Firm*—Joseph C. Gil; Richard E. L. Henderson; Lyndanne M. Whalen

[57] ABSTRACT

The present invention relates to a process for the preparation of substantially closed-cell rigid foams containing urethane, urea, biuret, and isocyanurate groups comprising reacting, at an index of greater than 110, organic polyisocyanates with relatively high molecular weight polyots consisting of mixtures of (i) polyesters containing at least two hydroxyl groups and having an OH value of greater than 150 and/or polyethers containing at least two hydroxyl groups and having an OH value of greater than 200, and (ii) polyoxyalkylene polyethers containing ethylene oxide residues and least two hydroxyl groups and having an OH value of less than 100, in the presence of isocyanate trimerization catalysts and water as blowing agent. The foams of the invention can optionally be prepared optionally, in the further presence chain-extending and/or crosslinking agents and auxiliaries. and/or additives.

The present invention also relates to a method using the foams of the invention as insulating materials and/or for reinforcing mechanical structural components.

12 Claims, No Drawings

PROCESS FOR THE PREPARATION OF SUBSTANTIALLY CLOSED-CELL RIGID FOAMS CONTAINING URETHANE, UREA, BIURET, AND ISOCYANURATE GROUPS AND A METHOD OF USE THEREOF

BACKGROUND OF THE INVENTION

This invention relates to a new process for the preparation of substantially closed-cell rigid foams containing urethane, urea, biuret, and isocyanurate groups and to their use as insulating materials and/or for reinforcing mechanical structural components.

Processes for the preparation of substantially closed-cell rigid foams containing urethane, urea, biuret, and isocyanurate groups are generally known. A review of the preparation of corresponding rigid foams can be found, for example in Kunststoff-Handbuch, Vol. VII, "Polyurethane", edited by R. Vieweg and A. Höchtlen, pages 504 et seq (Verlag Carl Hanser, Munich, 1966). Polyisocyanurate ("PIR") foams and modified PIR foams are described, for example, in *Advances in Urethane Science and Technology*, Vol. 3, pages 141 et seq. Vol. 2, pages 241 et seq (Technomic Publishing Co., Inc., 1974 and 1973).

To prepare such rigid foams, aromatic polyisocyanates are normally reacted with polyols of relatively high molecular weight, preferably polyether or polyester polyols, in the presence of blowing agents, catalysts, flameproofing agents, and other auxiliaries and additives. Corresponding mixtures of the polyether or polyester polyols can also be used. One of the determining factors in using mixtures is the reduction in costs that can often be attained by mixing expensive polyester polyols suitable for the production of high-quality rigid polyurethane foams with inexpensive polyether polyols. Suitable polyester polyols of low viscosity for the production of rigid polyurethane foams having good mechanical properties are described, for example, in German Offenlegungsschrift 2,704,196.

A particular advantage of using polyester polyols as the relatively high molecular weight polyhydroxyl compound in the production of rigid foams containing urethane and isocyanurate groups is an improvement in flame retardancy and a reduction in brittleness of the foams. A disadvantage, however, is that, on account of their relatively high polarity compared with polyether polyols (preferably polyoxypropylene polyols), polyester polyols are miscible only to a limited extent with the low-boiling halogenated hydrocarbons used as blowing agents. In particular, when using flameproofed high-index rigid isocyanurate-forming polyurethane foam formulations in which the polyol component consists predominantly of difunctional polyester polyols, adequate quantities of halogenated hydrocarbons blowing agents can longer be dissolved in the polyester polyol. According to German Offenlegungsschrift 3,642,666, this disadvantage is obviated by the concomitant use of polyester polyols containing alkyl side groups.

All the processes mentioned above require the use CFC blowing agents to obtain desirable rigid-foam characteristics such as, for example, strength, adhesion outer layers, and reduced inflammability. As can be seen from a comparison example described below, corresponding rigid loans show major disadvantages in the absence of CFC blowing agents, namely, brittleness, inflammability, and non-adhesion to outer layers.

Accordingly, the problem addressed by the present invention is to provide a new process for the preparation corresponding rigid foams having high strength, adhesion, and reduced inflammability which (a) uses conventional formulation constituents and yet (b) avoids the use of CFC blowing agents. It has now surprisingly been found that these problems are solved by the process according to the invention described in detail below.

SUMMARY OF THE INVENTION

The present invention relates to a process for the preparation of substantially closed-cell rigid foams containing urethane, urea, biuret, and isocyanurate groups comprising reacting, at an index of greater than 110,
(a) organic polyisocyanates with
(b) relatively high molecular weight polyols consisting of mixtures of
   (i) polyesters containing at least two hydroxyl groups and having an OH value of greater than 150 and/or polyethers containing at least two hydroxyl groups and having an OH value of greater than 200, and
   (ii) polyoxyalkylene polyethers containing ethylene oxide residues and at least two hydroxyl groups and having an OH value of less than 100,
in the presence of
(c) isocyanate trimerization catalysts and
(d) water as blowing agent, and optionally, in the further presence of
(e) chain-extending and/or crosslinking agents and
(f) one or more auxiliaries and/or additives.

In the preferred embodiments of the invention, the polyol component (b)(i) is a polyester having an OH value of 200 to 250 or a polyether having an OH value of 300 to 400; the polyol component (b)(ii) is a polyoxyalkylene polyether having an OH value of 25 to 56 and ethylene oxide content of 10 to 30% by weight (based on the total quantity of alkylene oxide residues present in the polyoxyalkylene polyether); the quantitative weight ratio of the polyol component (b)(i) to polyol component (b)(ii) is from about 90:10 to about 10:90 (preferably from 70:30 to 30:70); about 5 to about 50 mmole of isocyanate trimerization catalysts (c) are used per mole of isocyanate (a); the reaction is carried out at indexes of about 130 to about 250 (preferably 160 to 230); and the substantially closed-cell rigid foams containing urethane, urea, biuret, and isocyanurate groups have densities of 20 to 100 kg/m$^3$.

The present invention also relates to a method of using the substantially closed-cell rigid foams containing urethane, urea, biuret, and isocyanurate groups according to the invention as insulating materials and/or for reinforcing mechanical structural components.

DETAILED DESCRIPTION OF THE INVENTION

Of crucial importance to the invention are (1) the use of the above-mentioned polyethers containing ethylene in the polyol mixture and (2) the use of isocyanate trimerization catalysts. Suitable trimerization catalysts are extensively described, for example, in J. H. Saunders and Frisch, *Polyurethanes, Chemistry and Technology*, volume I, pages 94 et seq (1962). Preferred catalysts include salts organic acids, with alkali acetates (for example, dissolved in diols) being particularly preferred. Mannich bases (e.g., German Offenlegungsschriften 2,551,634 and 2,641,380), optionally together with salts of organic acids are also preferably used. The trimerization catalysts are generally used in quantities of about 1 to about 100 mmole (preferably 5 to 50 mmole) per mole of polyisocyanate (a).

Another important requirement for the invention (3) the maintenance of indexes (i.e., isocyanate indexes) greater than 110.

Starting isocyanate components include aliphatic, cycloaliphatic, araliphatic, aromatic, and heterocyclic polyisocyanates of the type described, for example, by Siefken in *Justus Liebigs Annalen der Chemie*, 362, pages 75 to 136. Examples of suitable isocyanates include those having the formula $$Q(NCO)_n$$

in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, or an aromatic hydrocarbon group containing 6 to about 15 (preferably 6 to 13) carbon atoms, for example, polyisocyanates of the type described in German Offenlegungsschrift 2,832,253, pages 10 to 11.

In general, it is particularly preferred to use the technically readily obtainable polyisocyanates, for example, 2,4- and 2,6-tolylene diisocyanate and mixtures of these isomers ("TDI"); polyphenyl polymethylene polyisocyanates of the type obtained by phosgenation of aniline-formaldehyde condensates ("crude MDI"); and polyisocyanates containing carbodiimide groups, urethane groups, allophanate groups, isocyanurate groups, urea groups, or biuret groups ("modified polyisocyanates"), particularly those modified polyisocyanates derived from 2,4- and/or 2,6-tolylene diisocyanate or from 4,4'- and/or 2,4'-diphenylmethane diisocyanate.

Other starting components include relatively high molecular weight organic compounds containing at least two hydroxyl groups. Suitable such starting components include mixtures of polyols consisting of (b)(i) polyesters having an OH value greater than about 150 (preferably from 200 to 250) and/or polyethers having an OH value of greater than about 200 (preferably from 300 to 400) and (b)(ii) polyoxyalkylene polyethers containing ethylene oxide residues and having an OH value of less than about 100 (preferably from 25 to 56) and preferably having an ethylene oxide content of 10 to 30% by weight based on the total quantity of alkylene oxide content of the polyether (b)(ii). The polyethers of component (b)(i) can contain (in addition to or in place of the ether oxygen atoms) tertiary nitrogen and disubstituted sulfur atoms. Polyols (b)(i) are members of a category of polyols sometimes known as rigid-foam polyesters or polyethers, and polyols (b)(ii) are sometimes known as flexible-foam polyethers.

The quantitative weight ratios of component (b)(i) to component (b)(ii) are generally from about 90:10 to about 10:90 (preferably in the range of from 70:30 to 30:70).

Other starting components are, optionally, compounds containing at least two isocyanate-reactive hydrogen atoms and having a molecular weight in the range from about 32 to about 399. Suitable compounds of this type include compounds containing hydroxyl groups, amino groups, thiol groups, carboxyl groups, or a combination thereof (preferably compounds containing hydroxyl groups and/or amino groups) that serve as chain-extending or crosslinking agents. These compounds generally contain 2 to 8 (preferably 2 to 4) isocyanate-reactive hydrogen atoms. Examples of such compounds can be found in German Offenlegungsschrift 2,832,253, pages 19 to 20.

Water is used as blowing agent.

The components described above are used in quantities such that the index is greater than 110.

Auxiliaries and additives may optionally also be used. Suitable auxiliaries and additives include surface-active additives, such as emulsifiers and foam stabilizers; reaction retarders; known cell regulators, such as paraffins, fatty alcohols, or dimethylpolysiloxanes; pigments or dyes; known flameproofing agents, such as tris(chloroethyl) phosphate and tricresyl phosphate; stabilizers against aging and weathering; plasticizers; fungistatic and bacteriostatic agents; and fillers, such as barium sulfate, kieselguhr, carbon black, or whiting. These optional auxiliaries and additives are described, for example, in German Offenlegungsschrift 2,732,292, pages 21 to 24.

Further examples of surface-active additives, foam stabilizers, cell regulators, reaction retarders, stabilizers, flameproofing agents, plasticizers, dyes, fillers, and fungistatic and bacteriostatic agents which may optionally be used in accordance with the invention, as well as information on the use of these additives and the way in which they work, can be found in *Kunststoff-Handbuch*, Vol. VII, edited by Vieweg and Höchtlen, Carl-Hanser-Verlag, Munich, 1966, for example, on pages 103 to 113.

The substantially closed-cell rigid foams containing urethane, urea, biuret, and isocyanurate groups are produced by known methods.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts and percentages by weight.

EXAMPLES

In the following Examples 1-7, foams are prepared using the following components in the quantities listed in the Table. All of the components are vigorously mixed and foamed in an open mold. The characteristics of the foams obtained are shown in the Table.

Flexible foam polyether 1 propylene -glycol-started polyether, OH value 28, containing 87% propylene oxide ("PO") and 13% terminal ethylene oxide ("EO")

Flexible foam polyether 2 propylene-glycol-started polypropylene oxide ether, OH value 56

Rigid foam polyester 1 polyester, OH value 213, of adipic/phthalic acid (1:0.5) and glycerol/propylene glycol Rigid foam polyester 2 polyester, OH value 380, of adipic/phthalic/oleic acid and trimethylolpropane Rigid foam polyether 1 N,N-bis(2-hydroxyethyl)amino-methanephosphonic acid diethyl ester, OH value 450

Rigid foam polyether 2 trimethylolpropane-started polyether, OH value 615, containing 33% PO and 67% terminal EO Rigid foam polyether 3 trimethylyolpropane-started polypropylene oxide ether, OH value 875

Flameproofing agent 1 dimethylmethanephosphonate
Flameproofing agent 2 tris(chloroisopropyl)phosphate
B 8421 polyether siloxane available from Goldschmidt AG
Catalyst 1 25% potassium acetate in diethylene glycol
Catalyst 2 N,N',N''-tris(dimethylamino)propylhexahydrotriazine
Isocyanate 1 propylene-glycol-started MDI-based prepolymer of crude MDI (viscosity at 24° C. of 200 mPa.s) and 8% polypropylene oxide ether (OH value 515), NCO content 24.5%
Isocyanate 2 crude MDI (viscosity at 24° C. of 200 mPa.s)

EXAMPLE 1

(Comparison Example)

This Example shows that formulations in which hydrophilic flexible-foam polyethers are not used exhibit essentially no adhesion, even at a surface temperature of 60° C. This formulation is a typical rigid foam formulation without the usual CFC blowing agents.

EXAMPLES 2 AND 3

These Examples show that foams in which hydrophilic flexible foam polyethers are used exhibit excellent adhesion at a surface temperature of 60° C.

EXAMPLE 4

(Comparison Example)

This Example shows that the use of non-hydrophilic flexible foam polyethers does not produce an adequate improvement in adhesion.

EXAMPLES 5 AND 7

These Examples show that flameproofing agents or rigid foam polyesters need not be used to obtain good adhesion. The use of only hydrophilic flexible foam polyethers and rigid-foam polyethers is sufficient.

EXAMPLE 6

This Example is based on a formulation of the invention that produces adequate adhesion even at room temperature.

TABLE

| | Example: | | | | | | |
|---|---|---|---|---|---|---|---|
| | 1 | 2 | 3 | 4 | 5 | 6 | 7 |
| Flexible foam polyether 1 (parts) | — | 47.8 | 12.4 | — | 30.7 | 41.4 | 30.9 |
| Flexible foam polyether 2 (parts) | — | — | — | 5.0 | — | — | — |
| Rigid foam polyester 1 (parts) | — | — | 12.4 | 5.0 | — | 8.2 | — |
| Rigid foam polyester 2 (parts) | 24.1 | 22.1 | — | — | — | — | — |
| Rigid foam polyether 1 (parts) | 10.4 | 9.6 | — | — | — | — | — |
| Rigid foam polyether 2 (parts) | — | — | — | — | 30.7 | — | — |
| Rigid foam polyether 3 (parts) | — | — | 12.4 | 5.0 | — | 8.2 | 30.9 |
| Flameproofing agent 1 (parts) | 6.5 | 6.0 | — | 6.4 | — | 13.9 | — |
| Flameproofing agent 2 (parts) | — | — | 15.9 | — | — | 13.9 | — |
| Water (parts) | 3.2 | 3.6 | 2.1 | 4.0 | 3.1 | 2.9 | 3.2 |
| B 8421 (parts) | 2.0 | 1.8 | 2.6 | 1.1 | 1.3 | 2.8 | 1.3 |
| Catalyst 1 (parts) | 1.4 | 1.1 | 2.1 | 2.9 | 2.5 | 3.1 | 2.5 |
| Catalyst 2 (parts) | 1.4 | 1.1 | 0.8 | 1.6 | — | — | — |
| Isocyanate 1 (parts) | 216.0 | 172.0 | 204.3 | 234.0 | — | — | — |
| Isocyanate 2 (parts) | — | — | — | — | 196.6 | 170.4 | 196.2 |
| Index | 200 | 150 | 230 | 230 | 200 | 230 | 200 |
| Cream time (sec) | 15 | 15 | 15 | 16 | 29 | 17 | 35 |
| Setting time (sec) | 42 | 60 | 54 | 67 | 115 | 55 | 95 |
| Rise time (sec) | 60 | 83 | 95 | 98 | 145 | 85 | 110 |
| Tack-free time (sec) | 65 | 150 | 96 | 100 | 145 | 75 | 120 |
| Density (kg/m$^3$) | 34.7 | 32.8 | 58.4 | 33.2 | 37.4 | 46.7 | 38.9 |
| Adhesion | | | | | | | |
| at 60° C. | minimal | good | good | none | good | good | good |
| at room temp. | none | minimal | none | none | none | average | minimal |
| Surface | brittle | tough | tough | brittle | tough | tough | tough |

What is claimed is:

1. A process for the preparation of a substantially closed-cell rigid foam containing urethane, urea, biuret, and isocyanurate groups comprising reacting, at an isocyanate index of greater than 110,
   (a) an organic polyisocyanate with
   (b) a relatively high molecular weight polyol consisting of a mixture of
      (i) a polyester containing at least two hydroxyl groups and having an OH value of greater than 150 and/or a polyether containing at least two hydroxyl groups and having an OH value of greater than 200, and
      (ii) a polyoxyalkylene polyether containing ethylene oxide residues and at least two hydroxyl groups and having an OH value of less than 100, in the presence of
   (c) an isocyanate trimerization catalyst and
   (d) water as blowing agent, and optionally, in the further presence of
   (e) a chain-extending and/or crosslinking agent and
   (f) one or more auxiliaries and/or additives.

2. A process according to claim 1 wherein component (b)(i) is a polyester having an OH value of 200 to 250 or a polyether having an OH value of 300 to 400.

3. A process according to claim 1 wherein components (b)(ii) is an polyoxyalkylene polyether having an OH value of 25 to 56 and an ethylene oxide content of 10 to 30% by weight based on the total amount of alkylene oxide residues in said polyether.

4. A process according to claim 1 wherein the quantitative weight ratio of component (b)(i) to component (b)(ii) is from 90:10 to 10:90.

5. A process according to claim 1 wherein the quantitative weight ratio of component (b)(i) to component (b)(ii) is from 70:30 to 30:70.

6. A process according to claim 1 wherein from 5 to 50 mmole of isocyanate trimerization catalyst (c) are used per mole of isocyanate component (a).

7. A process according to claim 1 wherein the index is from 130 to 250.

8. A process according to claim 1 wherein the index is from 160 to 230.

9. A process according to claim 1 wherein the substantially closed-cell rigid foam has a density of from 20 to 100 kg/m$^3$.

10. A method for insulating comprising using a substantially closed-cell rigid foam according to claim 1 as an insulating material.

11. A method for reinforcing mechanical structural components comprising using a substantially closed-cell rigid foam according to claim 1 as a reinforcing material.

12. A method for insulating and reinforcing mechanical structural components comprising using a substantially closed-cell rigid foam according to claim 1 as an insulating and reinforcing material.

* * * * *

UNITED STATES PATENT AND TRADEMARK OFFICE
CERTIFICATE OF CORRECTION

PATENT NO. : 5,350,780
DATED : September 27, 1994
INVENTOR(S) : Rainer Welte et al Page 1 of 2

It is certified that error appears in the above-indentified patent and that said Letters Patent is hereby corrected as shown below:

IN THE ABSTRACT:

At line 6, delete "polyots consisting of" and insert --polyols consisting of--.

At line 11, delete "oxide residues and least" and insert --oxide residues and at least--.

At lines 15-16, delete "presence chain-extending" and insert --presence of chain-extending--.

At column 1, line 24, delete "pages 141 et seq." and insert --pages 141 et seq. and--.

At column 1, lines 56-57, delete "blowing agents can longer be dissolved" and insert --blowing agents can no longer be dissolved--.

At column 1, lines 61-62, delete "require the use CFR blowing agents" and insert -- require the use of CFC blowing agents--.

At column 1, lines 63-64, delete "adhesion outer layers" and insert --adhesion to outer layers--.

UNITED STATES PATENT AND TRADEMARK OFFICE
CERTIFICATE OF CORRECTION

PATENT NO. : 5,350,780
DATED : September 27, 1994
INVENTOR(S) : Rainer Welte et al It is certified that error appears in the above-indentified patent and that said Letters Patent is hereby corrected as shown below:

At column 1, line 66, delete "rigid loans" and insert --rigid foams--.

At column 2, lines 2-3, delete "preparation corresponding rigid foams" and insert --preparation of corresponding rigid foams--.

At column 2, lines 59-60, delete "ethylene in the polyol mixture" and insert --ethylene oxide in the polyol mixture--.

At column 2, line 63, delete "Frisch," and insert --K.C. Frisch,--.

At column 2, line 65, delete "salts organic acids," and insert --salts of organic acids,--.

At column 3, line 5, delete "for the invention(3)" and insert --for the invention is (3)--.

At column 3, line 7, delete "greater than 110" and insert --of greater than 110--.

At column 3, line 9, delete "heterocyciic" and insert --heterocyclic--.

At column 3, line 11, delete "Siefken" and insert --W. Siefken--.

Signed and Sealed this

Seventh Day of February, 1995

Attest:

BRUCE LEHMAN

*Attesting Officer*          *Commissioner of Patents and Trademarks*